United States Patent
Guo et al.

(10) Patent No.: US 12,512,159 B2
(45) Date of Patent: Dec. 30, 2025

(54) MEMORY DEVICE AND METHOD FOR PERFORMING CACHE PROGRAM ON MEMORY DEVICE

(71) Applicant: YANGTZE MEMORY TECHNOLOGIES CO., LTD., Wuhan (CN)

(72) Inventors: Xiaojiang Guo, Wuhan (CN); Bo Li, Wuhan (CN); Jinchi Han, Wuhan (CN)

(73) Assignee: YANGTZE MEMORY TECHNOLOGIES CO., LTD., Wuhan (CN)

( * ) Notice: Subject to any disclaimer, the term of this patent is extended or adjusted under 35 U.S.C. 154(b) by 194 days.

(21) Appl. No.: 18/237,793

(22) Filed: Aug. 24, 2023

(65) Prior Publication Data
US 2024/0221838 A1   Jul. 4, 2024

Related U.S. Application Data

(60) Provisional application No. 63/436,440, filed on Dec. 30, 2022.

(30) Foreign Application Priority Data

Jul. 11, 2023   (CN) .......................... 202310847919.3

(51) Int. Cl.
*G11C 16/10*   (2006.01)
*G06F 3/06*   (2006.01)
*G11C 7/04*   (2006.01)
*G11C 16/12*   (2006.01)

(52) U.S. Cl.
CPC .......... *G11C 16/102* (2013.01); *G06F 3/0604* (2013.01); *G06F 3/0634* (2013.01); *G06F 3/0659* (2013.01); *G11C 7/04* (2013.01); *G11C 16/12* (2013.01)

(58) Field of Classification Search
CPC ......... G11C 16/102; G11C 7/04; G11C 16/12; G11C 11/5628; G11C 16/0483; G11C 16/10; G11C 16/3459; G11C 7/1057; G11C 7/1084; G11C 16/08; G11C 16/24; G11C 16/30; G11C 16/3404
See application file for complete search history.

(56) References Cited

U.S. PATENT DOCUMENTS

| | | | |
|---|---|---|---|
| 2019/0324693 A1* | 10/2019 | Ji | G06F 3/0604 |
| 2022/0113900 A1* | 4/2022 | Um | G06F 12/0804 |
| 2022/0139473 A1* | 5/2022 | Kim | G11C 16/0433 365/185.22 |

* cited by examiner

*Primary Examiner* — Donald HB Braswell
(74) *Attorney, Agent, or Firm* — BAYES PLLC (57) ABSTRACT

In certain aspects, a method for programming a memory device includes caching first program data and preparing first program information, performing a first program operation using the first program data and the first program information, during the first program operation, caching a second program data in a first cache latch and preparing second program information, and after the first program operation is completed, performing a second program operation using the second program data and the second program information.

19 Claims, 10 Drawing Sheets

MEMORY DEVICE AND METHOD FOR PERFORMING CACHE PROGRAM ON MEMORY DEVICE

CROSS-REFERENCE TO RELATED APPLICATIONS

This application claims the benefit of priorities to C.N. Application No. 202310847919.3, filed on Jul. 11, 2023, and U.S. Provisional Application No. 63/436,440, filed on Dec. 30, 2022, both of which are hereby incorporated by reference in their entireties.

BACKGROUND

The present disclosure relates to a memory device and methods for performing cache program on a memory device.

When a memory device, such as a NAND flash memory device, performs a program operation, a program command is used to instruct the memory device to perform the program operation. Following that, the data is written to the memory cell in a respective row and column using the address specified in the program command. The memory device may employ cache memory so that the data can be temporarily stored there before the program operation is performed.

SUMMARY

In one aspect, a method for programming a memory device includes caching first program data and preparing first program information, performing a first program operation using the first program data and the first program information, during the first program operation, caching a second program data in a first cache latch and preparing second program information, and after the first program operation is completed, performing a second program operation using the second program data and the second program information.

In some implementations, the first program operation includes performing a first pre-program operation, performing a first cell-program operation, and performing a first program recovery operation. The second program operation includes performing a second pre-program operation, performing a second cell-program operation, and performing a second program recovery operation. The first pre-program operation includes a first pre-charge operation and a first channel boosting operation. The first cell-program operation includes applying a first program voltage to a first word line. The second pre-program operation includes a second pre-charge operation and a second channel boosting operation. The second cell-program operation includes applying a second program voltage to a second word line.

In some implementations, performing the first pre-program operation includes applying a first pre-charge voltage to word lines of memory strings of the memory device during the first pre-charge operation.

In some implementations, preparing the first program information further includes determining a first program voltage, a first pass voltage, and a first bias voltage of the first cell-program operation, and determining a first pre-charge voltage of the first pre-charge operation. Preparing second program information further includes determining a second program voltage, a second pass voltage, and a second bias voltage of the second cell-program operation, and determining a second pre-charge voltage of the second pre-charge operation.

In some implementations, when memory cells in the memory device include a single-level cell (SLC), performing the first program operation indicates applying a first program voltage to the first word line corresponding to memory cells of a first page of the memory device, and performing the second program operation indicates applying a second program voltage to the second word line corresponding to memory cells of a second page of the memory device.

In some implementations, when the memory cells in the memory device include the SLC, the method further includes, when the second program operation and the first program operation are performed on memory cells coupled to a same word line, applying the first program voltage on the memory cells coupled to the same word line during the first cell-program operation, and applying the second program voltage on the memory cells coupled to the same word line during a second cell-program operation. The first program voltage is the same as the second program voltage.

In some implementations, when the second program operation and the first program operation are performed on the memory cells coupled to the same word line, the method further includes determining that a first temperature compensated parameter applied during the first program operation is the same as a second temperature compensated parameter applied during the second program operation.

In some implementations, the first program voltage is adjusted according to the first temperature compensated parameter, and the second program voltage is adjusted according to the second temperature compensated parameter.

In some implementations, when the memory cells in the memory device include the SLC, word lines of the memory device are divided into groups of word lines, and the method further includes, when the second program operation and the first program operation are performed on memory cells coupled to a same group of word lines, determining that the first program voltage applied on the memory cells coupled to the same group of word lines during the first cell-program operation is the same as the second program voltage applied on the memory cells coupled to the same group of word lines of a second cell-program operation.

In some implementations, when the second program operation and the first program operation are performed on the same group of word lines, the method further includes determining that a first temperature compensated parameter applied during the first program operation is the same as a second temperature compensated parameter applied during the second program operation.

In some implementations, the method further includes determining whether a first program operation is a last program operation, and when the first program operation is not the last program operation, caching the second program data in the first cache latch.

In some implementations, a start of performing the first program operation triggers caching the second program data in the first cache latch.

In some implementations, caching the second program data in the first cache latch and preparing the second program information is before the first program recovery operation is completed.

In some implementations, the method further includes during the first program operation, caching a third program data in a second cache latch and preparing third program information after caching the second program data in the second cache latch.

In some implementations, caching the third program data in the second cache latch and preparing the third program information is before the first program recovery operation is completed.

In some implementations, the method further includes, when the first program operation is completed, updating word line address information before performing the second program operation.

In another aspect, a memory device includes a memory cell array including memory cells, a page buffer coupled to the memory cell array, and a control logic coupled to the memory cell array. The control logic is configured to cache first program data in the page buffer, perform a first program operation using the first program data, during the first program operation, cache a second program data in the page buffer, and after the first program operation is completed, perform a second program operation using the second program data.

In some implementations, to perform the first program operation, the control logic is further configured to perform a first pre-program operation, perform a first cell-program operation, and perform a first program recovery operation. To perform the second program operation, the control logic is further configured to perform a second pre-program operation, perform a second cell-program operation, and perform a second program recovery operation. Performing the first pre-program operation includes performing a first pre-charge operation and performing a first channel boosting operation. Performing the first cell-program operation includes instructing a word line driver to apply a first program voltage to a first word line. Performing the second pre-program operation includes performing a second pre-charge operation and performing a second channel boosting operation. Performing the second cell-program operation includes instructing the word line driver to apply a second program voltage to a second word line.

In some implementations, performing the first pre-charge operation includes instructing the word line driver to apply a first pre-charge voltage to word lines of memory strings of the memory cell array during the first pre-charge operation.

In some implementations, when memory cells in the memory device includes a single-level cell (SLC), performing the first cell-program operation indicates applying the first program voltage to the first word line corresponding to memory cells of a first page of the memory device, and performing the second cell-program operation indicates applying the second program voltage to the second word line corresponding to memory cells of a second page of the memory device.

In some implementations, when the memory cells in the memory device include the SLC, the control logic is further configured to, when the second program operation and the first program operation are performed on a same word line, determine that the first program voltage is the same as the second program voltage.

In some implementations, the control logic is further configured to determine whether the first program operation is a last program operation, and when the first program operation is not the last program operation, cache the second program data in the page buffer after performing the first program operation.

In some implementations, the control logic is further configured to, after a start of performing the first program operation, cache the second program data in the page buffer.

In some implementations, the control logic is further configured to cache the second program data in the page buffer before the first program recovery operation is completed.

In some implementations, the control logic is further configured to, during the first program operation, cache a third program data in a second cache latch after caching the second program data in the second cache latch.

In some implementations, the control logic is further configured to, when the first program operation is completed, update word line address information before performing the second program operation.

In yet another aspect, a system includes a memory device, and a memory controller coupled to the memory device. The memory device includes a memory cell array including memory cells, a page buffer coupled to the memory cell array, and a control logic coupled to the memory cell array. The control logic is configured to cache first program data in the page buffer, perform a first program operation using the first program data, during the first program operation, cache a second program data in the page buffer, and after the first program operation is completed, perform a second program operation using the second program data.

BRIEF DESCRIPTION OF THE DRAWINGS

The accompanying drawings, which are incorporated herein and form a part of the specification, illustrate aspects of the present disclosure and, together with the description, further serve to explain the present disclosure and to enable a person skilled in the pertinent art to make and use the present disclosure.

Aspects of the present disclosure will be described with reference to the accompanying drawings.

DETAILED DESCRIPTION

Although specific configurations and arrangements are described, it should be understood that this is done for illustrative purposes only. As such, other configurations and arrangements can be used without departing from the scope of the present disclosure. Also, the present disclosure can be employed in a variety of other applications. Functional and structural features as described in the present disclosure can be combined, adjusted, and modified with one another and in ways not specifically depicted in the drawings, such that these combinations, adjustments, and modifications are within the scope of the present disclosure.

In general, terminology may be understood at least in part from usage in context. For example, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Typical page programming time (tPROG) is a significant performance parameter that determines write performance of a three-dimensional (3D) NAND Flash memory device. This is particularly significant for a single level per cell (SLC) NAND Flash memory device. In a quad-level cell (QLC) NAND Flash memory device, the tPROG of the QLC NAND Flash memory device is much longer than that of an SLC NAND Flash memory device or a multi-level cell (MLC) NAND Flash memory device. A memory system can write data to QLC NAND Flash memory device in SLC mode. The data is then copied from the SLC block to the QLC block in the background. As such, SLC tPROG also becomes a key performance parameter for QLC NAND Flash memory device. Furthermore, when the memory system is powered off, cache data of the memory system needs to be written to NAND device in a very short time, so SLC tPROG is particularly important in such cases. Last, since NAND typically takes a long time to prepare the information needed for programming. In some applications or products, this preparation time may be more than 20 µs. The preparation time is a significant overhead of SLC tPROG.

To address one or more of the aforementioned issues, the present disclosure introduces a solution in which a cache program command is designed to prepare the next program data and program information during a period of a present program operation and recovery operation. That is, when performing the present program operation and recovery operation, the next program data and program information can be simultaneously prepared. Since the preparation time of the next program data and program information is saved by the simultaneously processing, the total tPROG can also be reduced.

Figure 1:
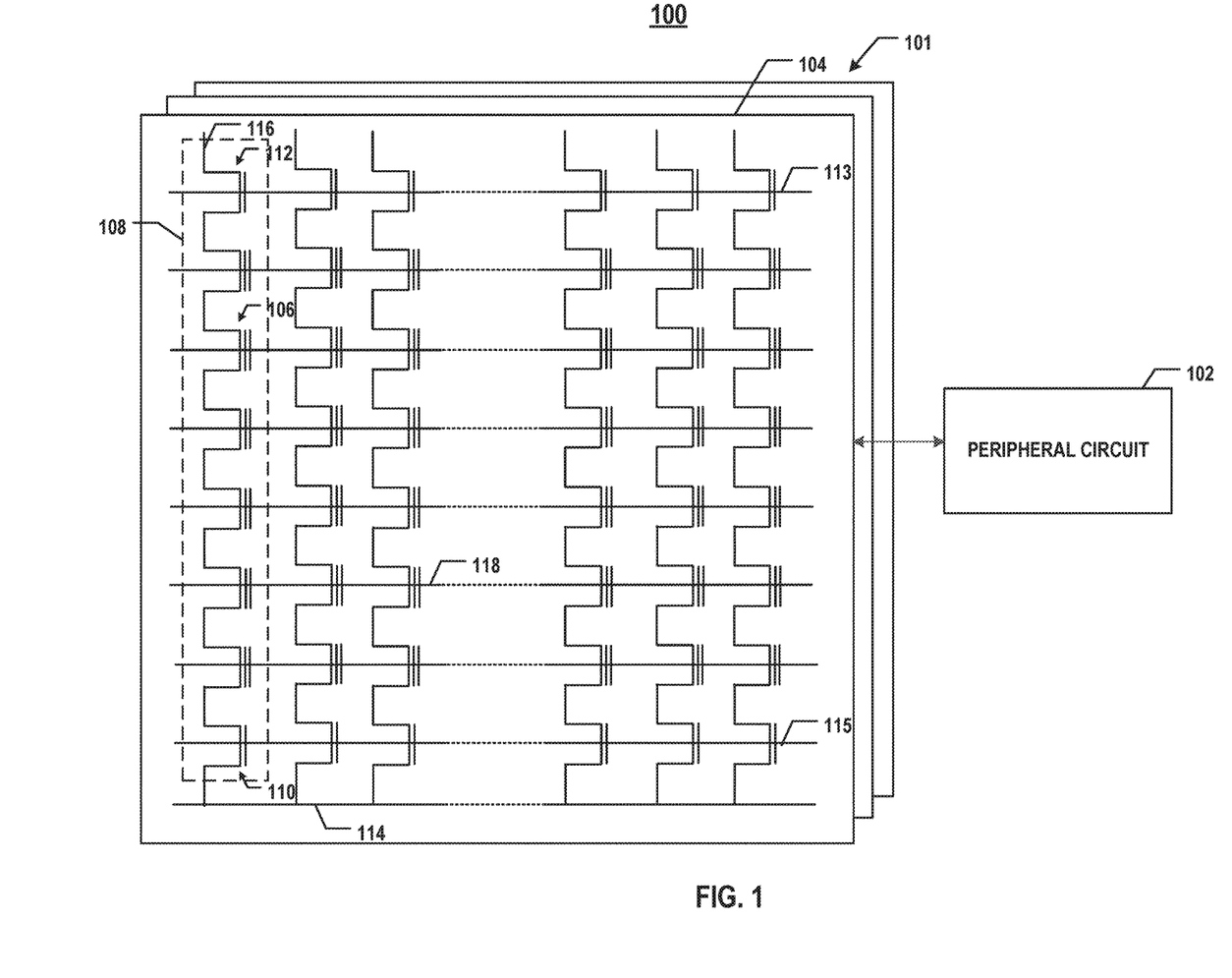
FIG. 1 illustrates a schematic circuit diagram of an example memory device including peripheral circuits, according to some implementations of the present disclosure.

FIG. 1 illustrates a schematic circuit diagram of an example memory device 100 including peripheral circuits, according to some aspects of the present disclosure. It is noted that the NAND Flash disclosed herein is only one example of the memory device for illustrative purposes. It can include any suitable solid-state, non-volatile memory, e.g., NOR Flash, ferroelectric RAM (FeRAM), phase-change memory (PCM), magnetic RAM (MRAM), spin tunnel torque RAM (STT MRAM), or resistive RAM (RRAM), etc. Memory device 100 can include a memory cell array 101 and peripheral circuits 102 coupled to memory cell array 101. Memory cell array 101 can be a NAND Flash memory cell array in which memory cells 106 are provided in the form of an array of NAND memory strings 108 each extending vertically above a substrate (not shown). In some implementations, each NAND memory string 108 includes a plurality of memory cells 106 coupled in series and stacked vertically. Each memory cell 106 can hold a continuous, analog value, such as an electrical voltage or charge, which depends on the number of electrons trapped within a region of memory cell 106. Each memory cell 106 can be either a floating gate type of memory cell including a floating-gate transistor or a charge trap type of memory cell including a charge-trap transistor.

In some implementations, at least one of memory cells 106 is a single-level cell (SLC) that has two possible memory states and thus, can store one bit of data. For example, the first memory state "0" can correspond to a first range of voltages, and the second memory state "1" can correspond to a second range of voltages. In some implementations, at least one of memory cells 106 is a multi-level cell (MLC) that is capable of storing more than a single bit of data in more than four memory states. For example, the MLC can store two bits per cell, three bits per cell (also known as triple-level cell (TLC)), or four bits per cell (also known as a quad-level cell (QLC)). Each MLC can be programmed to assume a range of possible nominal storage values. In one example, if each MLC stores two bits of data, then the MLC can be programmed to assume one of three possible programming levels from an erased state by writing one of three possible nominal storage values to the cell. A fourth nominal storage value can be used for the erased state.

As shown in FIG. 1, each NAND memory string 108 can include a source select gate (SSG) transistor 110 at its source end and a drain select gate (DSG) transistor 112 at its drain end. SSG transistor 110 and DSG transistor 112 can be configured to activate selected NAND memory strings 108 (columns of the array) during read and program operations. In some implementations, the sources of NAND memory strings 108 in the same block 104 are coupled through a same source line (SL) 114, e.g., a common SL. In other words, all NAND memory strings 108 in the same block 104 have an array common source (ACS), according to some implementations. The drain of DSG transistor 112 of each NAND memory string 108 is coupled to a respective bit line 116 from which data can be read or written via an output bus (not shown), according to some implementations. In some implementations, each NAND memory string 108 is configured to be selected or deselected by applying a select voltage (e.g., above the threshold voltage of DSG transistor 112) or a deselect voltage (e.g., 0 V) to the gate of respective DSG transistor 112 through one or more DSG lines 113 and/or by applying a select voltage (e.g., above the threshold voltage of SSG transistor 110) or a deselect voltage (e.g., 0 V) to the gate of respective SSG transistor 110 through one or more SSG lines 115.

As shown in FIG. 1, NAND memory strings 108 can be organized into multiple blocks 104, each of which can have a common source line 114, e.g., coupled to the ACS. In some implementations, each block 104 is the basic data unit for erase operations, i.e., all memory cells 106 on the same block 104 are erased at the same time. To erase memory cells 106 in a selected block 104, source lines 114 coupled to selected block 104 as well as unselected blocks 104 in the same plane as selected block 104 can be biased with an erase voltage (Vers), such as a high positive voltage (e.g., 20 V or more). Memory cells 106 of adjacent NAND memory strings 108 can be coupled through word lines 118 that select which row of memory cells 106 is affected by the read and program operations. Peripheral circuits 102 can be coupled to memory cell array 101 through bit lines 116, word lines 118, source lines 114, SSG lines 115, and DSG lines 113. Peripheral circuits 102 can include any suitable analog, digital, and mixed-signal circuits for facilitating the operations of memory cell array 101 by applying and sensing voltage signals and/or current signals to and from each target memory cell 106 through bit lines 116, word lines 118, source lines 114, SSG lines 115, and DSG lines 113. Peripheral circuits 102 can include various types of peripheral circuits formed using metal-oxide-semiconductor (MOS) technologies.

Figure 2:
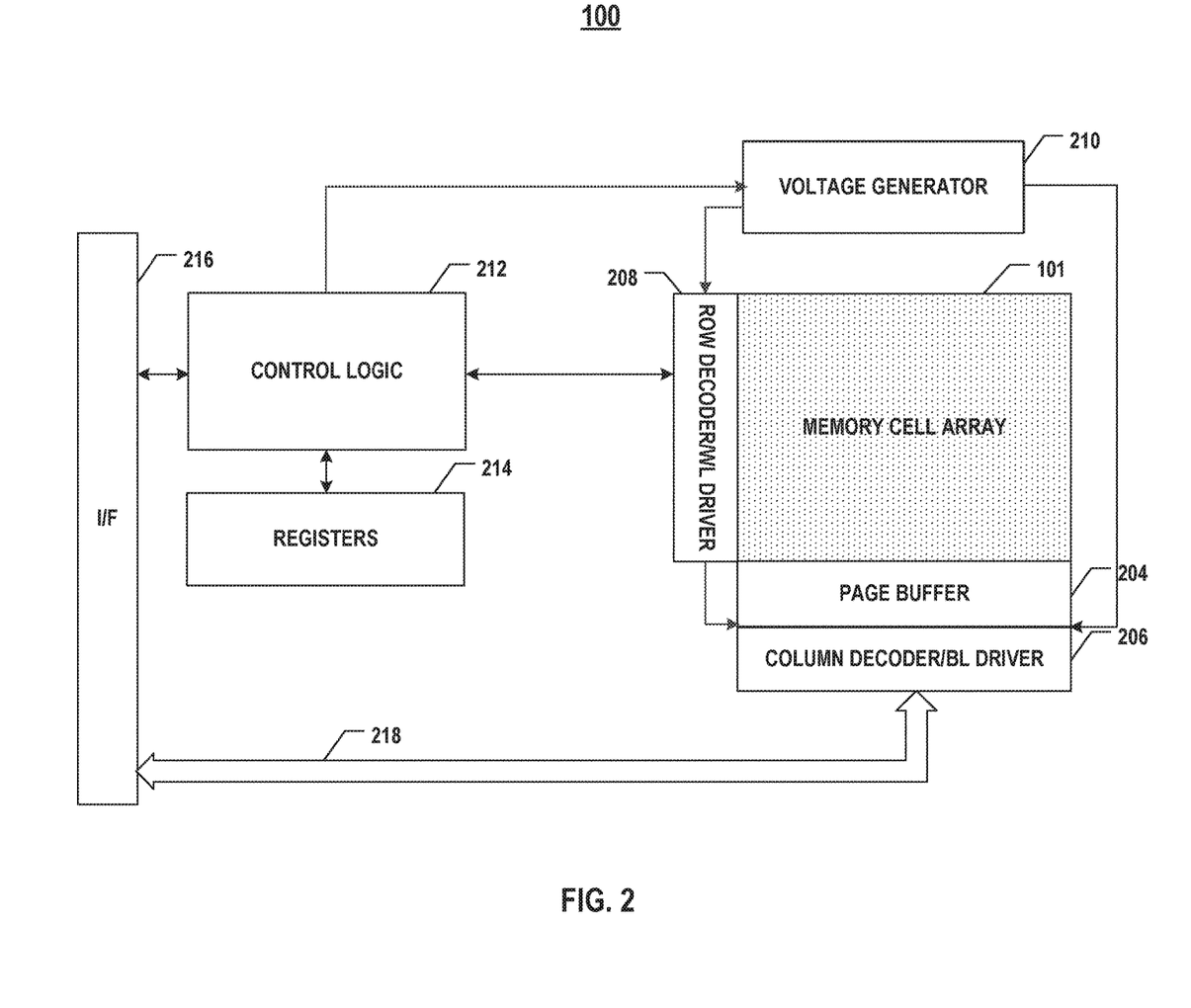
FIG. 2 illustrates a block diagram of an example memory device including a memory cell array and peripheral circuits, according to some implementations of the present disclosure.

FIG. 2 illustrates some example peripheral circuits 102 including a page buffer 204, a column decoder/bit line driver 206, a row decoder/word line driver 208, a voltage generator 210, control logic 212, registers 214, an interface (I/F) 216, and a data bus 218. It is understood that in some examples, additional peripheral circuits 102 may be included as well.

Page buffer 204 can be configured to buffer data read from or programmed to memory cell array 101 according to the control signals of control logic 212. In one example, page buffer 204 may store one page of program data (write data) to be programmed into one row of memory cell array 101. In another example, page buffer 204 also performs program verify operations to ensure that the data has been properly programmed into memory cells 106 coupled to selected word lines 118.

Row decoder/word line driver 208 can be configured to be controlled by control logic 212 and select or unselect a block 104 of memory cell array 101 and select or unselect a word line 118 of selected block 104. Row decoder/word line driver 208 can be further configured to drive memory cell array 101. For example, row decoder/word line driver 208 may drive memory cells 106 coupled to the selected word line 118 using a word line voltage generated from voltage generator 210. In some implementations, row decoder/word line driver 208 can include a decoder and string drivers (driving transistors) coupled to local word lines and word lines 118.

Voltage generator 210 can be configured to be controlled by control logic 212 and generate the word line voltages (e.g., read voltage, program voltage, pass voltage, local voltage, and verification voltage) to be supplied to memory cell array 101. In some implementations, voltage generator 210 is part of a voltage source that provides voltages at various levels of different peripheral circuits 102 as described below in detail. Consistent with the scope of the present disclosure, in some implementations, the voltages provided by voltage generator 210, for example, to row decoder/word line driver 208 and page buffer 204 are above certain levels that are sufficient to perform the memory operations. For example, the voltages provided to page buffer 204 may be between 2 V and 3.3 V, such as 3.3 V, and the voltages provided to row decoder/word line driver 208 may be equal to or greater than 3.3 V, such as between 3.3 V and 30 V.

Column decoder/bit line driver 206 can be configured to be controlled by control logic 212 and select one or more 3D NAND memory strings 108 by applying bit line voltages generated from voltage generator 210. For example, column decoder/bit line driver 206 may apply column signals for selecting a set of N bits of data from page buffer 204 to be outputted in a read operation.

Control logic 212 can be coupled to each peripheral circuit 102 and configured to control operations of peripheral circuits 102. Registers 214 can be coupled to control logic 212 and include status registers, command registers, memory data registers, memory address registers, and control registers for storing status information, command operation codes (OP codes), memory data, memory addresses, and control command addresses for controlling the operations of each peripheral circuit 102.

Interface 216 can be coupled to control logic 212 and configured to interface memory cell array 101 with a memory controller (not shown). In some implementations, interface 216 acts as a control buffer to buffer and relay control commands received from the memory controller and/or a host (not shown) to control logic 212 and status information received from control logic 212 to the memory controller and/or the host. Interface 216 can also be coupled to page buffer 204 and column decoder/bit line driver 206 via data bus 218 and act as an Input/Output (I/O) interface and a data buffer to buffer and relay the program data received from the memory controller and/or the host to page buffer 204 and the read data from page buffer 204 to the memory controller and/or the host. In some implementations, interface 216 and data bus 218 are part of an I/O circuit of peripheral circuits 102.

Figure 3A:
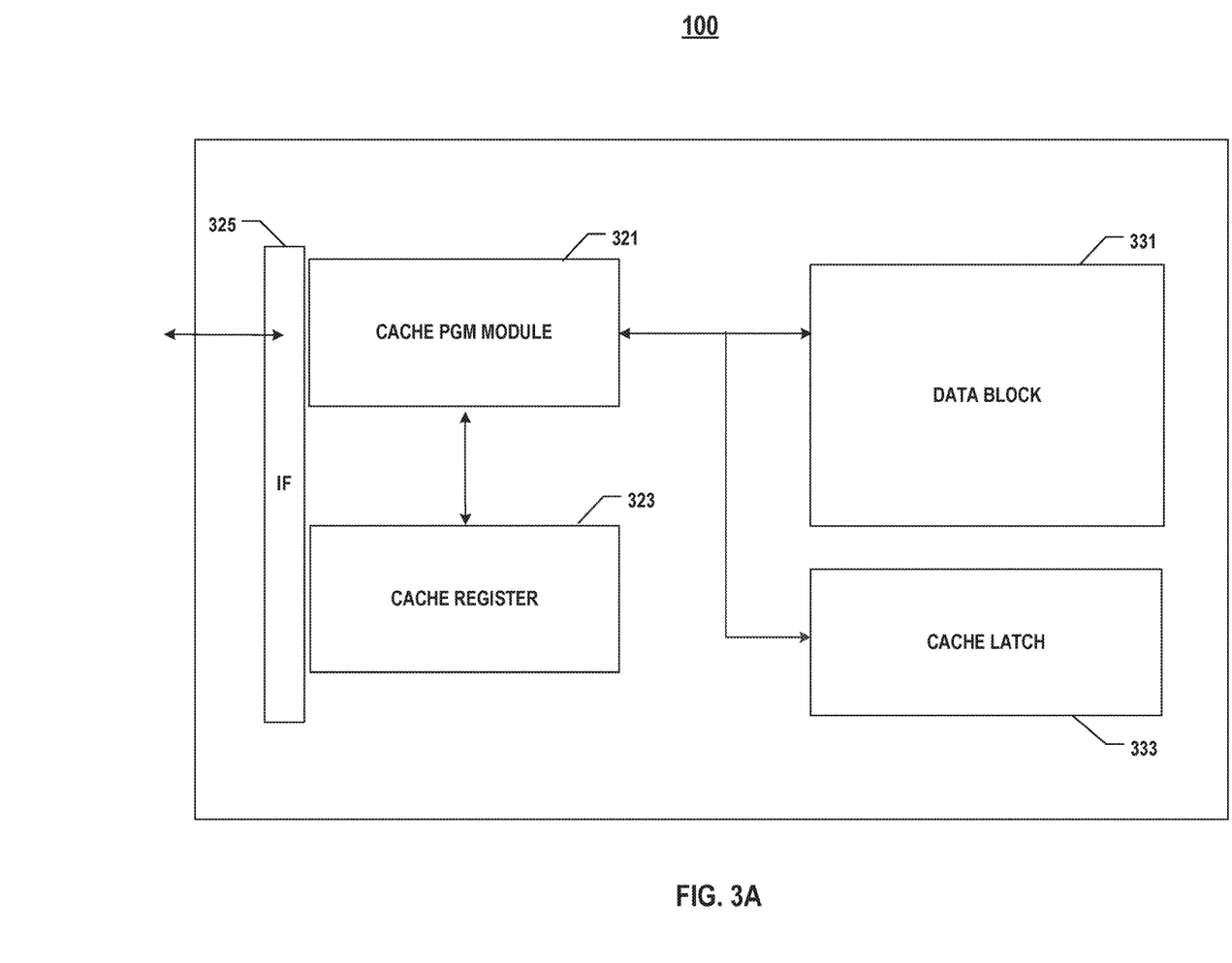
FIG. 3A illustrates a block diagram of an example memory device, according to some aspects of the present disclosure.

FIG. 3A illustrates some example components of peripheral circuits 102 including a data block 331, a cache latch 333, a cache program module 321, a cache register 323, and an interface (I/F) 325. It is understood that in some examples, additional components of peripheral circuits 102 may be included as well.

Data block 331 may correspond to or be included in memory cell array 101 and is configured to store data during the program operation.

Cache latch 333 may correspond to or be included in page buffer 204 and is configured to temporarily store data, e.g., one or several pages of program data (write data), to be programmed into one row of memory cell array 101.

Cache register 323 may correspond to or be included in registers 214 and is configured to store data, addresses or other information during the cache program operations.

Cache program module 321 may correspond to or be included in control logic 212 and is configured to receive a cache program command from the memory controller (not shown) and/or the host (not shown), and execute the cache program operations. For example, cache program module 321 is configured to cache first program data from cache register 323 in register 214, to a first cache latch (e.g., in cache latch 333) in page buffer 204 in response to receiving the cache program command or other instructions. Cache program module 321 is also configured to cache second program data from cache register 323 in register 214, to the first cache latch during the first program operation (i.e., during the period of programming the first program data into data block 331). It is noted that in some examples, cache program module 321 is also configured to perform other cache program operations according to some implementations of the present disclosure as well.

Interface 325 may correspond to or be included in interface 216 and is configured to interface data block 331 with a memory controller (not shown). In some implementations, interface 325 acts as a control buffer to buffer and relay control commands, e.g., a cache program command according to some implementations of the present disclosure, received from the memory controller and/or a host (not shown) to cache program module 321 and status information received from cache program module 321 to the memory controller and/or the host.

Figure 3B:
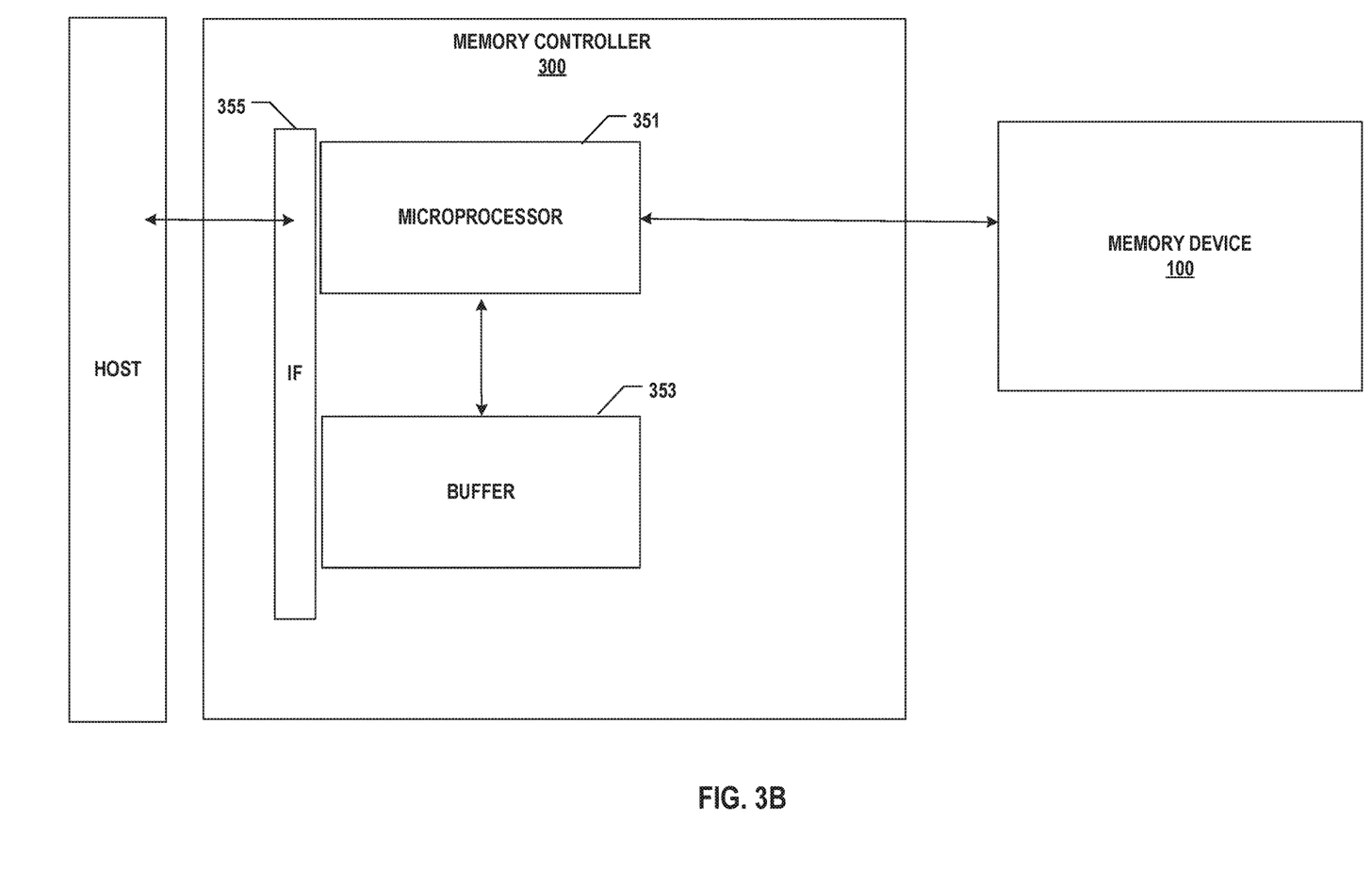
FIG. 3B illustrates a block diagram of an example memory system including a memory controller and a memory device, according to some aspects of the present disclosure.

FIG. 3B illustrates some example components of a memory system including memory device 100 and a memory controller 300. It is understood that in some examples, additional components of the memory system may be included as well. Memory controller 300 may include a microprocessor 351, buffer 353, and a controller interface (I/F) 355.

Microprocessor 351 is configured to control operations of memory device 100. For example, microprocessor 351 is configured to execute commands or instructions to perform functions disclosed in the present disclosure. Microprocessor 351 can include a memory chip controller (MCC) or a memory controller unit (MCU). Buffer 353 can be coupled to microprocessor 351 and include status registers, command registers, memory data registers, memory address registers, and control registers for storing status information, command operation codes (OP codes), memory data, memory addresses, and control command addresses for controlling the operations of memory device 100. For example, microprocessor 351 may be configured to read out temperature data/information of memory device 100 and store the temperature data/information in buffer 353. In other examples, microprocessor 351 may be configured to read out word line bias data/information or temperature information of memory device 100 and store the word line bias data/information in buffer 353. As such, microprocessor 351 may be configured to perform temperature compensation or word line bias compensation control by instructing memory device 100 (e.g., control logic 212) to perform these compensation control operations. In some implementations, memory device 100 (e.g., control logic 212) may read out word line bias data/information or temperature information of memory device 100, store these information in page buffer 204 or other cache memory in memory device 100, and perform temperature compensation or word line bias compensation control. In some implementations, these compensation control operations can be performed according to different program stages or time sequences.

Controller interface (I/F) 355 and is configured to communicate between memory controller 300 and a host. In some implementations, controller interface 355 acts as a control buffer to buffer and relay control commands, e.g., a cache program command according to some implementations of the present disclosure, received from the host, and status information received from memory device 100 to memory controller 300.

Figure 4A:
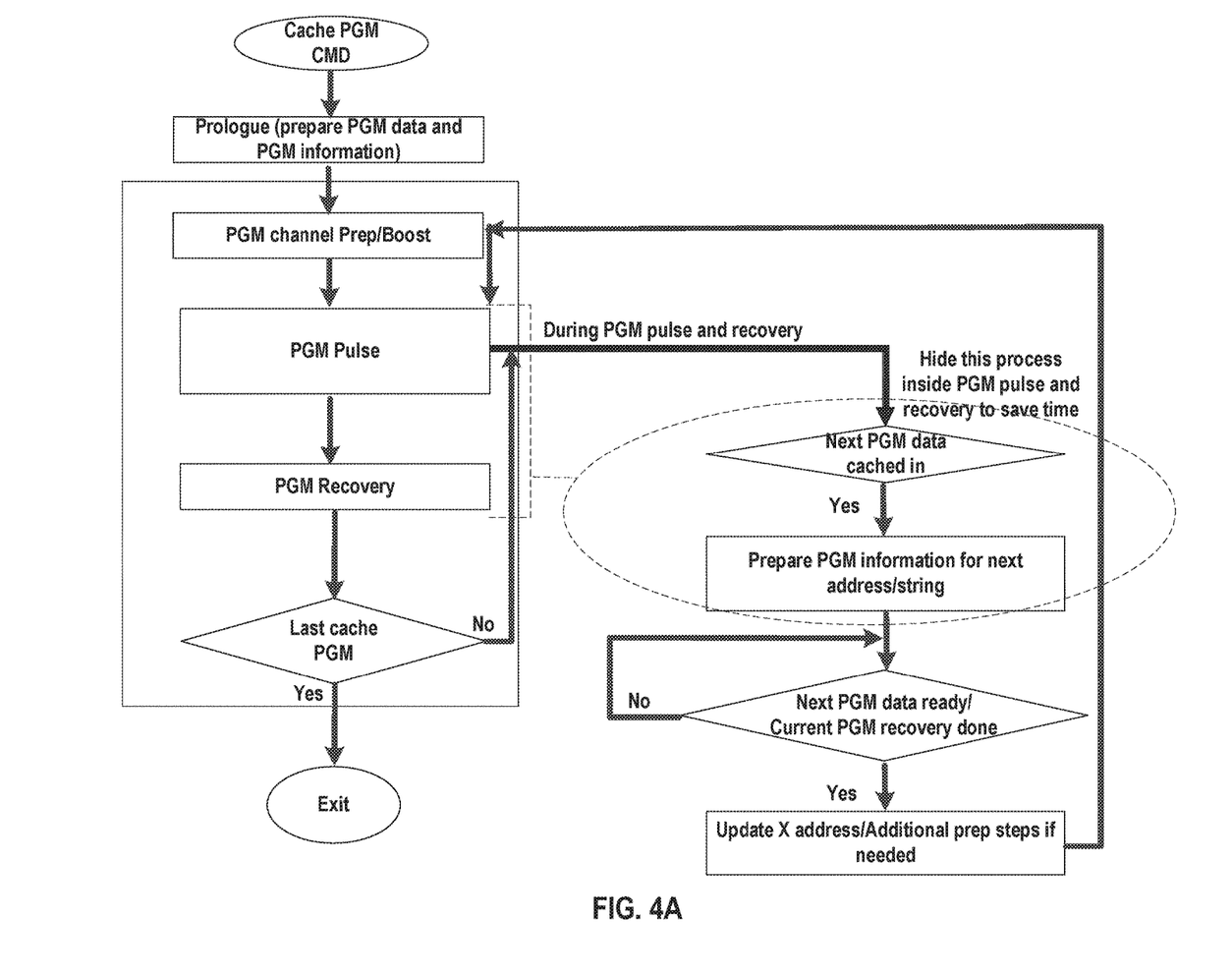
FIG. 4A illustrates a flowchart illustrating an example cache program scheme, according to some aspects of the present disclosure.

FIG. 4A illustrates a flowchart illustrating an example cache program scheme, according to some aspects of the present disclosure. FIG. 4C illustrates a timing diagram for a sequence of operations illustrating an example cache program scheme, according to some aspects of the present disclosure. FIG. 4A and FIG. 4C will be discussed together. As shown in FIG. 4A, upon receiving a cache program command (e.g., a first command) from a host or a memory controller (e.g., memory controller 300), a first program preparation operation (e.g., a prologue of program operation) is performed by caching first program data and/or first program address into memory device 100 (e.g., registers 214 or page buffer 204) and preparing first program information. These operations can be executed by control logic 212. In some implementations, the first program information includes information of blank blocks in memory device 100, voltages to be applied to memory device 100 including channel pre-charge voltages, channel boosting voltages, bit line bias voltages, program voltages of selected word lines (WLs), and/or pass voltages of unselected WLs. For example, the first program information may include a first program voltage, a first pass voltage, and a first bias voltage of a first cell-program operation.

Next, a first program operation including a first pre-program operation and the first cell-program operation is performed. The first pre-program operation includes a first pre-charge operation and/or a first channel boosting operation. In some implementations, the first pre-charge operation includes applying a first pre-charge voltage to word lines of memory strings of memory device 100 to pre-charge a channel of the memory strings of memory device 100. The first pre-charge operation can be executed by control logic 212, and control logic 212 is configured to instruct word line driver 208 to apply a first pre-charge voltage to word lines of the memory strings of memory cell array 101 to pre-charge the corresponding channel of the memory strings of memory cell array 101. In some implementations, the first channel boosting operation includes applying a first channel boosting voltage to word lines of the memory strings of memory device 100 to boost the channel of the memory strings of memory device 100. After the first pre-program operation is performed, the first cell-program operation is performed. In some implementations, the first cell-program operation includes applying a first program voltage to a first selected word line of memory device 100.

During the first program operation, a second program data is cached in a first cache latch (e.g., in cache latch 333), and second program information is prepared. In some implementations, as shown in FIG. 4C, a start of performing the first program operation triggers caching the second program data in the first cache latch and/or preparing the second program information. Also, as shown in FIG. 4C, caching the second program data in the first cache latch and/or preparing the second program information before a first program recovery operation is completed. As such, the process of caching the next program data (e.g., the second program data) can be hidden in the first program operation. In some implementations, in the case that caching the second program data in the first cache latch and/or preparing the second program information is completed and that the first program operation is still undergoing, a third program data can be cached in a second cache latch (e.g., also in cache latch 333) and third program information can be prepared. It is noted that caching the third program data and preparing the third program information may be completed before the first program recovery operation is completed. Once the first program operation and/or the first program recovery operation is completed, the second program data and/or the third program data, as well as the second program information and/or the third program information, can be well-prepared to be provided in a following second program operation. As such, the caching time of the second program data and/or the third program data, and the preparation time of second program information and/or the third program information can be significantly saved.

In some implementations, as shown in FIG. 4A, after the first program recovery is completed, if it determines that it is the last cache program data, then the cache program operation is completed. In addition, as shown in FIG. 4A, when the next program data is ready, it determines whether the current program recovery operation is done or not. If the current recovery operation is completed, it may update the addresses of the memory cells and state additional preparation steps if needed. If no updates or additional preparation steps are needed, it may start the next program operation.

Figure 4B:
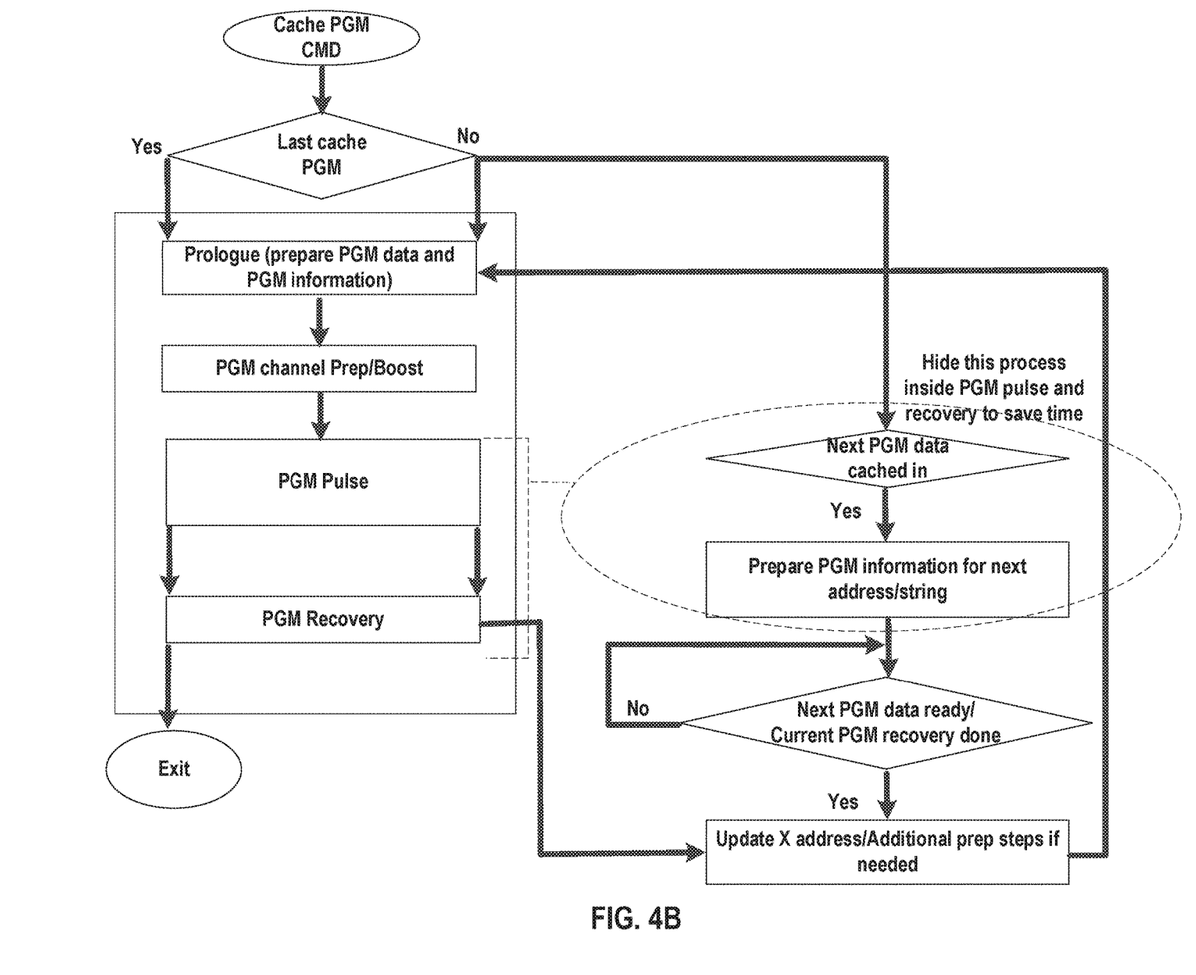
FIG. 4B illustrates a flowchart illustrating an example cache program scheme, according to some aspects of the present disclosure.
Figure 4C:
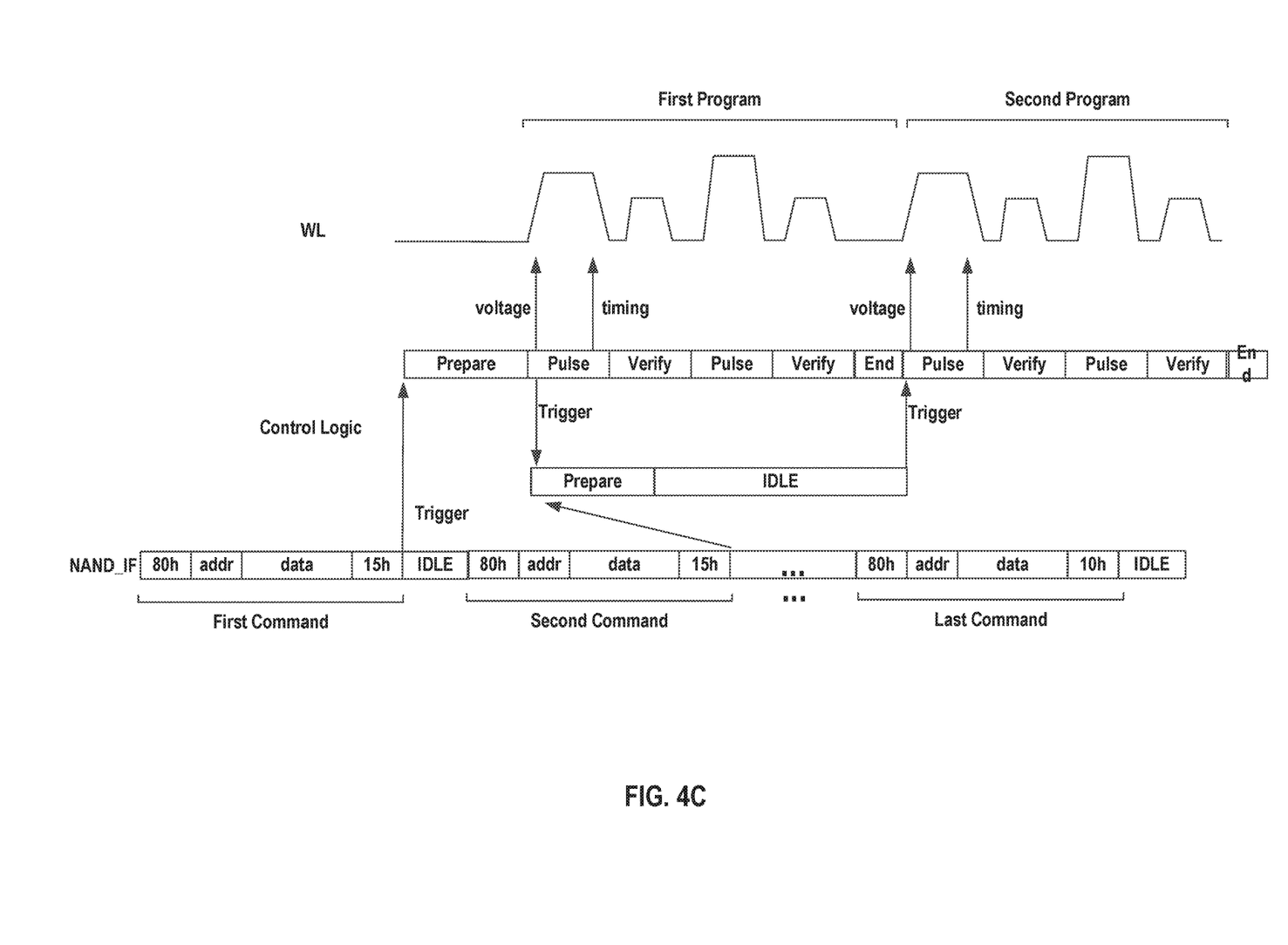
FIG. 4C illustrates a timing diagram for a sequence of operations illustrating an example cache program scheme, according to some aspects of the present disclosure.

FIG. 4B illustrates a flowchart illustrating an example cache program scheme, according to some aspects of the present disclosure. FIG. 4C illustrates a timing diagram for a sequence of operations illustrating an example cache program scheme, according to some aspects of the present disclosure. FIG. 4B and FIG. 4C will be discussed together. As shown in FIG. 4B, upon receiving a cache program command (e.g., a first command) from a host or a memory controller (e.g., memory controller 300), whether it is the last cache program command (e.g., a program command with a last program data) is determined. For example, as shown in FIG. 4B, if it is determined that the command is the last cache program command (e.g., the last command includes a 10 h instruction while the first command and the second command include a 15 h instruction, as shown in FIG. 4C), the present program operation is the last program operation. And after the present program recovery operation is completed, it may quit the cache program operation. If it is determined that the command is not the last cache program command, it starts a first program preparation operation (e.g., a prologue of program operation), as in FIG. 4A. The implementations of the first program preparation operation and other operations in FIG. 4B are the same or similar to that of in FIG. 4A, and thus will not be repeated.

Figure 5:
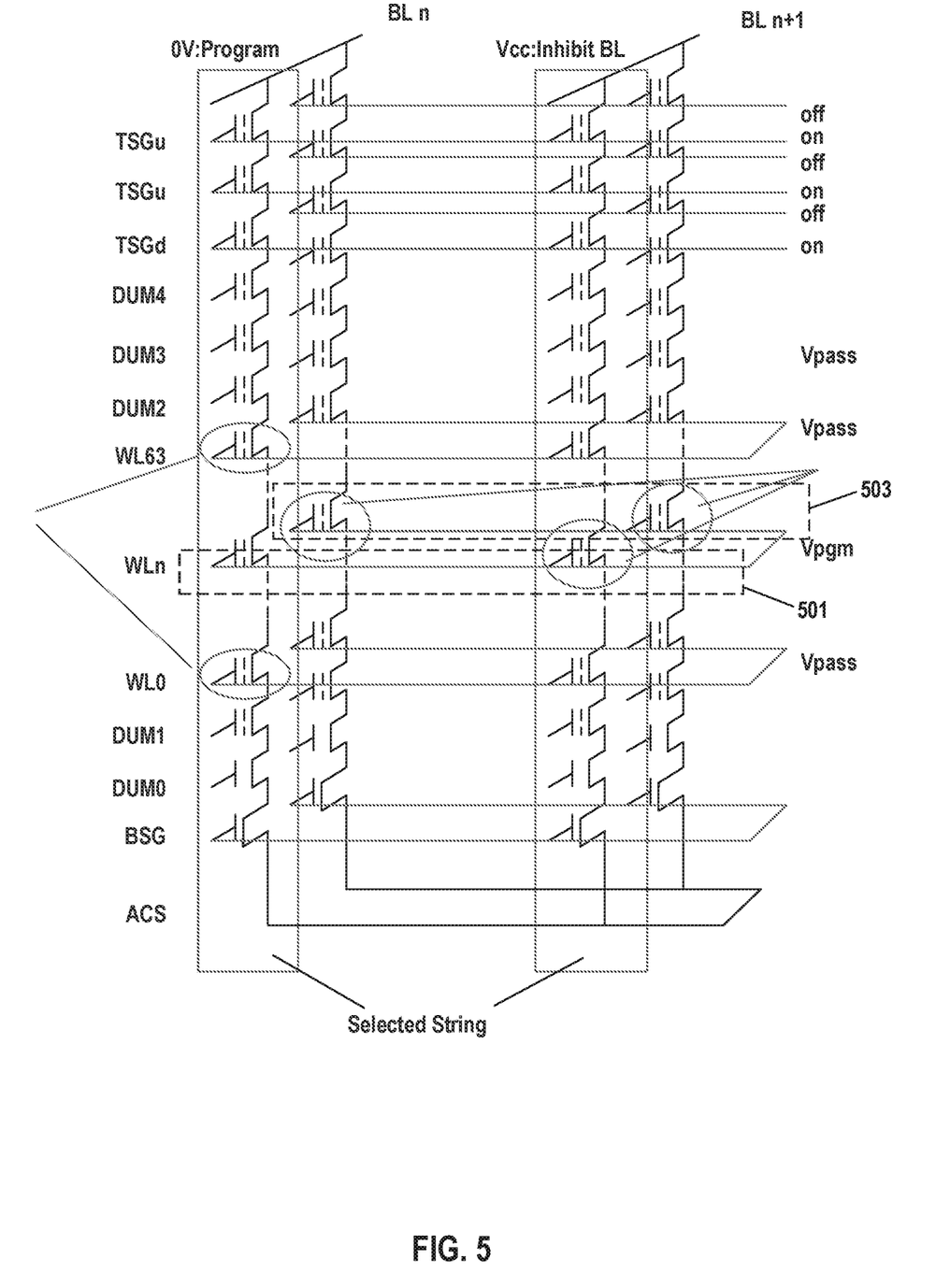
FIG. 5 illustrates a schematic diagram of a NAND flash memory block, according to some aspects of the present disclosure.

FIG. 5 illustrates a schematic diagram of a NAND flash memory block, according to some aspects of the present disclosure. In an example of an SLC NAND Flash memory device, as shown in FIG. 5, program operation is performed once a page. That is, performing the first program operation indicates applying a first program voltage on the memory cells of a first page of memory device 100, and performing the second program operation indicates applying a second program voltage on the memory cells of a second page of memory device 100.

In some implementations, when the second program operation and the first program operation are performed on the memory cells coupled to a same word line, it may apply the same program voltage on the memory cells coupled to the same word line. That is, when the second program operation and the first program operation are performed on the memory cells coupled to the same word line, it may apply the first program voltage on the memory cells coupled to the same word line during the first cell-program operation and apply the second program voltage on the memory cells coupled to the same word line during the second cell-program operation, where the first program voltage is the same as the second program voltage. As such, the program voltage does not have to change if the next program operation and the present program operation are performed on the same word line. It is noted that this is not limited to the program voltages. Pass voltages and/or bias voltages can also be applied under this circumstance.

In some implementations, when the second program operation and the first program operation are performed on the memory cells coupled to a same group of word lines, it may apply the same program voltage on the memory cells coupled to the same group of word lines. For example, as shown in FIG. 5, WL0 to WL63 may be divided into three groups of word lines, e.g., WL0 to WL21, WL22 to WL43, and WL44 to WL64. That is, when the second program operation and the first program operation are performed on the memory cells coupled to the same group of word lines, it may apply the first program voltage on the memory cells coupled to the same group of word lines during the first cell-program operation and apply the second program voltage on the memory cells coupled to the same group of word lines during the second cell-program operation, where the first program voltage is the same as the second program voltage. As such, the program voltage does not have to change if the next program operation and the present program operation are performed on the same group of word lines. It is noted that this is not limited to the program voltages. Pass voltages and/or bias voltages can also be applied under this circumstance.

In some implementations, in a same word line (e.g., WLn) of adjacent program operation (e.g., adjacent pages, such as first page 501 and second page 503 as in FIG. 5), the temperature compensation applied can be the same. When the second program operation and the first program operation are performed on the memory cells coupled to a same word line of adjacent pages, it may further determine that a first temperature compensated parameter applied during the first program operation is the same as a second temperature compensated parameter applied during the second program operation. It is noted that the first program voltage may be adjusted according to the first temperature compensated parameter, and the second program voltage may be adjusted according to the second temperature compensated parameter.

Figure 6:
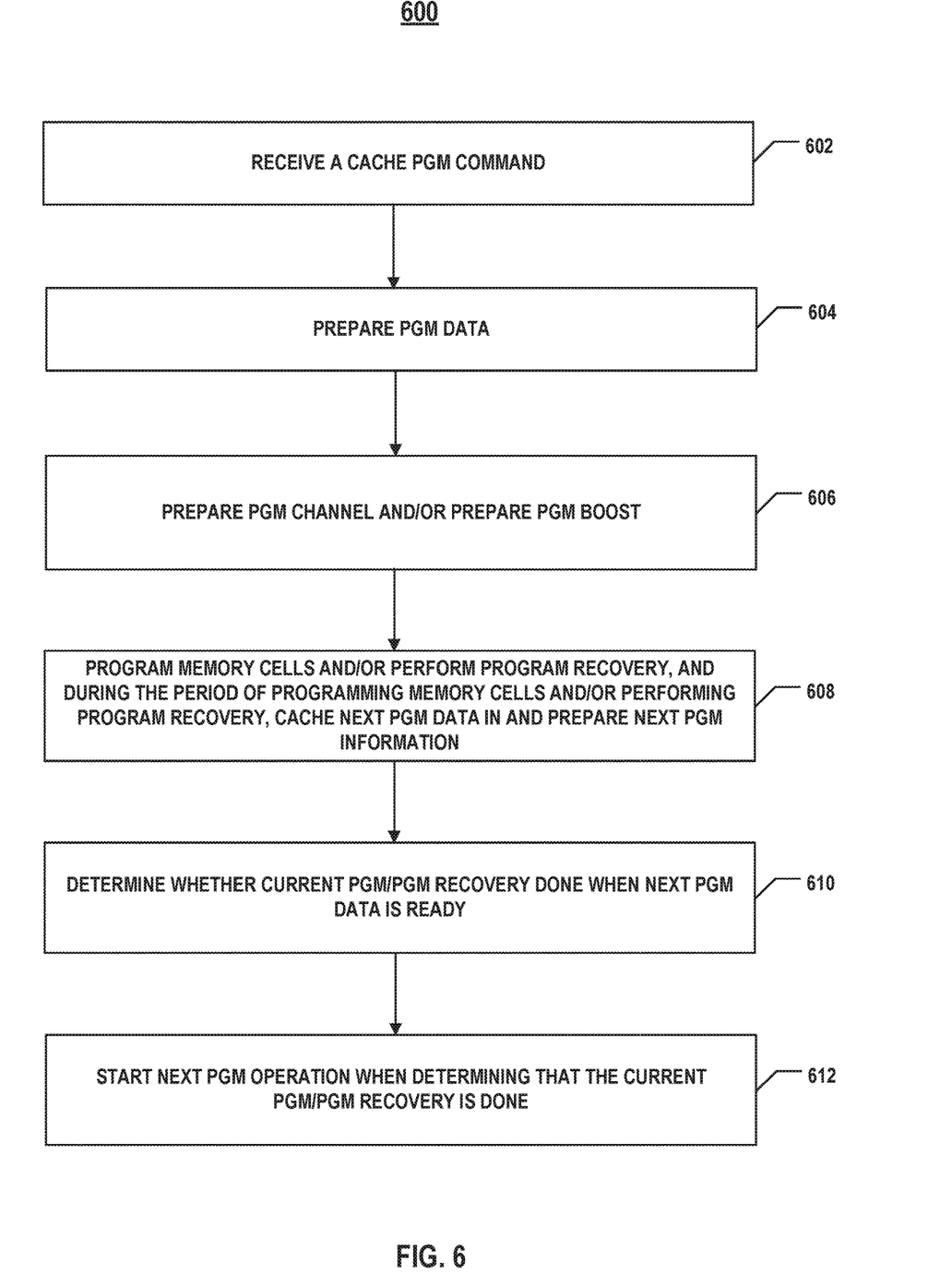
FIG. 6 illustrates a flowchart of an example method for perming cache program of a memory device, according to some aspects of the present disclosure.

FIG. 6 illustrates a flowchart of an example method for perming cache program on a memory device, according to some aspects of the present disclosure.

Referring to FIG. 6, method 600 starts at operation 602 in which a control logic (e.g., control logic 212 as in FIG. 2) receives a cache program command from a host or a memory controller (e.g., memory controller 300 in FIG. 3B).

Method 600 proceeds to operation 604, as illustrated in FIG. 6, in which the first program data and first program information are prepared.

After caching the first program data in the first cache latch and preparing the first program information as mentioned above, method 600 proceeds to operation 606, in which a pre-program operation including a first pre-charge operation and a first channel boosting operation is performed. In some implementations, the first pre-charge operation includes applying a first pre-charge voltage to a channel of memory strings of memory device 100. In some implementations, the first channel boosting operation includes applying a first channel boosting voltage to the channel of the memory strings of memory device 100.

After the first pre-program operation is performed, method 600 proceeds to operation 608, in which the first cell-program operation and the first program recovery operation are performed, and during the period of the first cell-program operation and the first program recovery operation, the next program data is cached in, and the next program information is prepared. In some implementations, the first cell-program operation includes applying a first program voltage to a first selected word line of memory device 100.

Next, method 600 proceeds to operation 610, in which whether the current program operation and program recovery operation are completed is determined.

Last, method 600 proceeds to operation 612, in which when the next program data is ready and the current program operation and program recovery operation are completed, the next program operation can be triggered and started.

Figure 7:
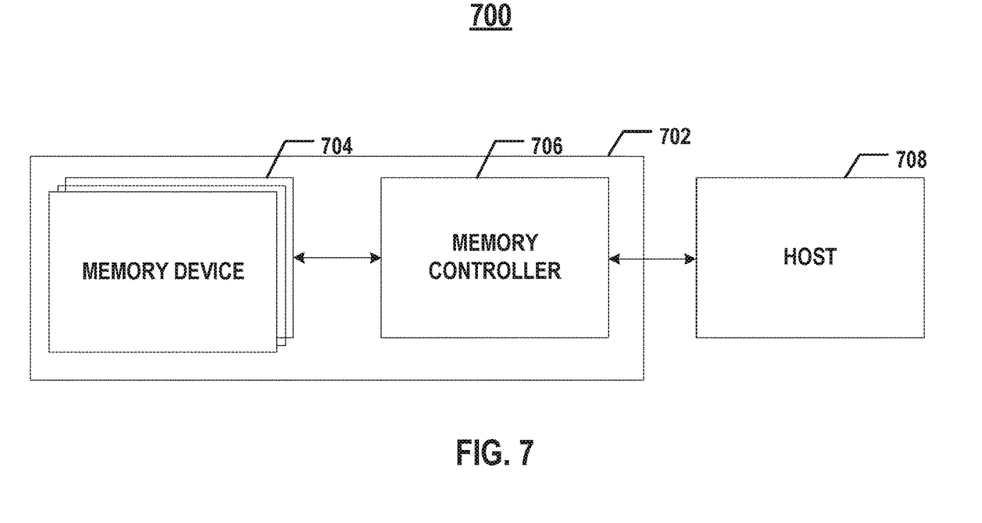
FIG. 7 illustrates a block diagram of an example system having a host and a memory system, according to some aspects of the present disclosure.

FIG. 7 illustrates a block diagram of an example system 700 having a memory device, according to some aspects of the present disclosure. System 700 can be a mobile phone, a desktop computer, a laptop computer, a tablet, a vehicle computer, a gaming console, a printer, a positioning device, a wearable electronic device, a smart sensor, a virtual reality (VR) device, an argument reality (AR) device, or any other suitable electronic devices having storage therein. As shown in FIG. 7, system 700 can include a host 708 and a memory system 702 having one or more memory devices 704 (e.g., may correspond to memory device 100) and a memory controller 706 (e.g., may correspond to memory controller 300).

Host 708 can be a processor of an electronic device, such as a central processing unit (CPU), or a system-on-chip (SoC), such as an application processor (AP). Host 708 can be coupled to memory controller 706 and configured to send or receive data to or from memory devices 704 through memory controller 706. For example, host 708 may send the program data in a program operation or receive the read data in a read operation. Host 708 is configured to receive and transmit instructions and commands to and from memory controller 706 of memory system 702, and execute or perform multiple functions and operations provided in the present disclosure. For example, host 708 may send a cache program command to perform a cache program operation.

Memory device 704 can be any memory device disclosed in the present disclosure, such as a NAND Flash memory device, which includes a page buffer having multiple portions, for example, four quarters.

Memory controller 706 can be implemented by microprocessors, microcontrollers (a.k.a. microcontroller units (MCUs)), digital signal processors (DSPs), application-specific integrated circuits (ASICs), field-programmable gate arrays (FPGAs), programmable logic devices (PLDs), state machines, gated logic, discrete hardware circuits, and other suitable hardware, firmware, and/or software configured to perform the various functions described below in detail.

Memory controller 706 is coupled to memory device 704 and host 708 and is configured to control memory device 704, according to some implementations. Memory controller 706 can manage the data stored in memory device 704 and communicate with host 708. In some implementations, memory controller 706 is designed for operating in a low duty-cycle environment like secure digital (SD) cards, compact Flash (CF) cards, universal serial bus (USB) Flash drives, or other media for use in electronic devices, such as personal computers, digital cameras, mobile phones, etc. In some implementations, memory controller 706 is designed for operating in a high duty-cycle environment SSDs or embedded multi-media-cards (eMMCs) used as data storage for mobile devices, such as smartphones, tablets, laptop computers, etc., and enterprise storage arrays. Memory controller 706 can be configured to control operations of memory device 704, such as read, erase, and program operations, by providing instructions, such as read instructions, to memory device 704. For example, memory controller 706 may be configured to provide a read instruction to the peripheral circuit of memory device 704 to control the read operation. Memory controller 706 can also be configured to manage various functions with respect to the data stored or to be stored in memory device 704 including, but not limited to bad-block management, garbage collection, logical-to-physical address conversion, wear leveling, etc. In some implementations, memory controller 706 is further configured to process error correction codes (ECCs) with respect to the data read from or written to memory device 704. Any other suitable functions may be performed by memory controller 706 as well, for example, formatting memory device 704.

Memory controller 706 can communicate with an external device (e.g., host 708) according to a particular communication protocol. For example, memory controller 706 may communicate with the external device through at least one of various interface protocols, such as a USB protocol, an MMC protocol, a peripheral component interconnection (PCI) protocol, a PCI-express (PCI-E) protocol, an advanced technology attachment (ATA) protocol, a serial-ATA protocol, a parallel-ATA protocol, a small computer small interface (SCSI) protocol, an enhanced small disk interface (ESDI) protocol, an integrated drive electronics (IDE) protocol, a Firewire protocol, etc.

Figure 8A:
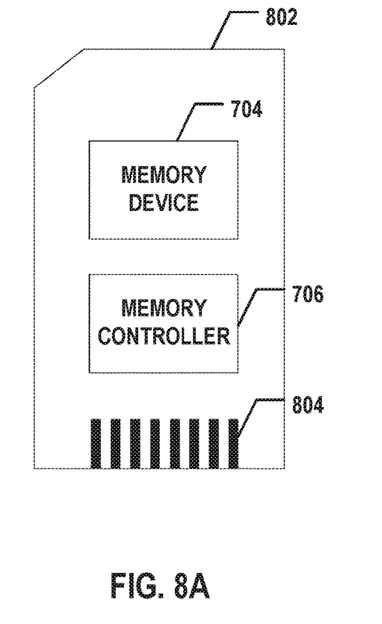
FIG. 8A illustrates a diagram of an example memory card having a memory device, according to some aspects of the present disclosure.
Figure 8B:
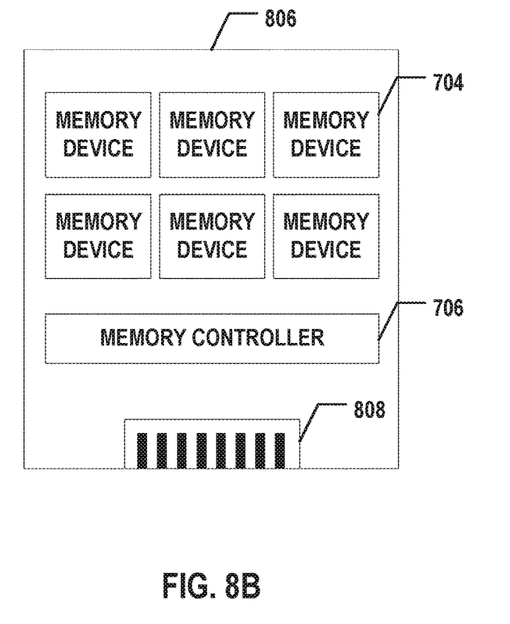
FIG. 8B illustrates a diagram of an example solid-state drive (SSD) having a memory device, according to some aspects of the present disclosure.

Memory controller 706 and one or more memory devices 704 can be integrated into various types of storage devices, for example, being included in the same package, such as a universal Flash storage (UFS) package or an eMMC package. That is, memory system 702 can be implemented and packaged into different types of end electronic products. In one example as shown in FIG. 8A, memory controller 706 and a single memory device 704 may be integrated into a memory card 802. Memory card 802 can include a PC card (PCMCIA, personal computer memory card international association), a CF card, a smart media (SM) card, a memory stick, a multimedia card (MMC, RS-MMC, MMCmicro), an SD card (SD, miniSD, microSD, SDHC), a UFS, etc. Memory card 802 can further include a memory card connector 804 coupling memory card 802 with a host (e.g., host 708 in FIG. 7). In another example as shown in FIG. 8B, memory controller 706 and multiple memory devices 704 may be integrated into an SSD 806. SSD 806 can further include an SSD connector 808 coupling SSD 806 with a host (e.g., host 708 in FIG. 7). In some implementations, the storage capacity and/or the operation speed of SSD 806 is greater than those of memory card 802.

The foregoing description of the specific implementations can be readily modified and/or adapted for various applications. Therefore, such adaptations and modifications are intended to be within the meaning and range of equivalents of the disclosed implementations, based on the teaching and guidance presented herein.

The breadth and scope of the present disclosure should not be limited by any of the above-described exemplary implementations, but should be defined only in accordance with the following claims and their equivalents.

What is claimed is:

1. A method for programming a memory device, comprising: caching first program data and preparing first program information;
   performing a first program operation using the first program data and the first program information, wherein the first program operation comprises:
   performing a first pre-program operation, wherein the first pre-program operation comprises:
   a first pre-charge operation by applying a first pre-charge voltage to word lines of memory strings of the memory device, and a first channel boosting operation; and
   performing a first cell-program operation, wherein the first cell-program operation comprises applying a first program voltage to a first word line;

during the first program operation, caching a second program data in a first cache latch and preparing second program information; and after the first program operation is completed, performing a second program operation using the second program data and the second program information, wherein the second program operation comprises: performing a second pre-program operation, wherein the second pre-program operation comprises a second pre-charge operation and a second channel boosting operation.

2. The method of claim 1, wherein the first program operation further comprises:
performing a first program recovery operation;
performing a second cell-program operation, wherein the second cell-program operation comprises applying a second program voltage to a second word line; and
performing a second program recovery operation.

3. The method of claim 2, wherein preparing the first program information further comprises:
determining a first program voltage, a first pass voltage, and a first bias voltage of the first cell-program operation, and determining a first pre-charge voltage of the first pre-charge operation, and wherein preparing second program information further comprises:
determining a second program voltage, a second pass voltage, and a second bias voltage of the second cell-program operation, and determining a second pre-charge voltage of the second pre-charge operation.

4. The method of claim 2, wherein when memory cells in the memory device comprise a single-level cell (SLC), performing the first program operation indicates applying the first program voltage to the first word line corresponding to memory cells of a first page of the memory device, and performing the second program operation indicates applying a second program voltage to the second word line corresponding to memory cells of a second page of the memory device.

5. The method of claim 4, wherein when the memory cells in the memory device comprise the SLC, the method further comprises:
when the second program operation and the first program operation are performed on memory cells coupled to a same word line, applying the first program voltage on the memory cells coupled to the same word line during the first cell-program operation, and applying the second program voltage on the memory cells coupled to the same word line during a second cell-program operation, wherein the first program voltage is the same as the second program voltage.

6. The method of claim 5, wherein when the second program operation and the first program operation are performed on the memory cells coupled to the same word line, the method further comprises:
determining that a first temperature compensated parameter applied during the first program operation is the same as a second temperature compensated parameter applied during the second program operation.

7. The method of claim 6, wherein the first program voltage is adjusted according to the first temperature compensated parameter, and the second program voltage is adjusted according to the second temperature compensated parameter.

8. The method of claim 4, wherein when the memory cells in the memory device comprise the SLC, word lines of the memory device are divided into groups of word lines, and the method further comprises:

when the second program operation and the first program operation are performed on memory cells coupled to a same group of word lines, determining that the first program voltage applied on the memory cells coupled to the same group of word lines during the first cell-program operation is the same as the second program voltage applied on the memory cells coupled to the same group of word lines of a second cell-program operation.

9. The method of claim 8, wherein when the second program operation and the first program operation are performed on the same group of word lines, the method further comprises:
determining that a first temperature compensated parameter applied during the first program operation is the same as a second temperature compensated parameter applied during the second program operation.

10. The method of claim 1, further comprising:
determining whether the first program operation is a last program operation; and
when the first program operation is not the last program operation, caching the second program data in the first cache latch.

11. The method of claim 1, wherein a start of performing the first program operation triggers caching the second program data in the first cache latch.

12. The method of claim 2, wherein caching the second program data in the first cache latch and preparing the second program information is before the first program recovery operation is completed.

13. The method of claim 2, further comprising:
during the first program operation, caching a third program data in a second cache latch and preparing third program information after caching the second program data in the second cache latch.

14. The method of claim 13, wherein caching the third program data in the second cache latch and preparing the third program information is before the first program recovery operation is completed.

15. The method of claim 1, further comprising:
when the first program operation is completed, updating word line address information before performing the second program operation.

16. A memory device, comprising: a memory cell array comprising memory cells; a page buffer coupled to the memory cell array; and a control logic coupled to the memory cell array, wherein the control logic is configured to: cache first program data in the page buffer;
perform a first program operation using the first program data,
wherein the first program operation comprises:
performing a first pre-program operation, wherein the first pre-program operation comprises: a first pre-charge operation by applying a first pre-charge voltage to word lines of memory strings of the memory device, and a first channel boosting operation; and
performing a first cell-program operation, wherein the first cell-program operation comprises applying a first program voltage to a first word line;
during the first program operation, cache a second program data in the page buffer; and after the first program operation is completed, perform a second program operation using the second program data
wherein the second program operation comprises: performing a second pre-program operation, wherein the second pre-program operation comprises a second pre-charge operation and a second channel boosting operation.

17. The memory device of claim 16, wherein the control logic is further configured to:
   determine whether the first program operation is a last program operation;
   when the first program operation is not the last program operation, cache the second program data in the page buffer after performing the first program operation; and
   after a start of performing the first program operation, cache the second program data in the page buffer.

18. The memory device of claim 16, wherein the control logic is further configured to:
   during the first program operation, cache a third program data in a second cache latch after caching the second program data in the second cache latch; and
   when the first program operation is completed, update word line address information before performing the second program operation.

19. A system, comprising: a memory device; and a memory controller coupled to the memory device, wherein the memory device comprises: a memory cell array comprising memory cells; a page buffer coupled to the memory cell array; and a control logic coupled to the memory cell array, wherein the control logic is configured to:
   cache first program data in the page buffer;
   perform a first program operation using the first program data, wherein the first program operation comprises:
   performing a first pre-program operation, wherein the first pre-program operation comprises: a first pre-charge operation by applying a first pre-charge voltage to word lines of memory strings of the memory device, and a first channel boosting operation; and
   performing a first cell-program operation, wherein the first cell-program operation comprises applying a first program voltage to a first word line;
   during the first program operation, cache a second program data in the page buffer; and after the first program operation is completed, perform a second program operation using the second program data
   wherein the second program operation comprises: performing a second pre-program operation, wherein the second pre-program operation comprises a second pre-charge operation and a second channel boosting operation.

* * * * *